(12) United States Patent
Shiohara (10) Patent No.: US 8,482,638 B2
(45) Date of Patent: Jul. 9, 2013

(54) DIGITAL CAMERA GENERATING COMPOSITE IMAGE FROM MAIN IMAGE AND SUB-IMAGE, AND METHOD FOR MANUFACTURING SAME

(75) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 12/976,048

(22) Filed: Dec. 22, 2010

(65) Prior Publication Data

US 2011/0157404 A1 Jun. 30, 2011

(30) Foreign Application Priority Data

Dec. 25, 2009 (JP) ................................. 2009-295202

(51) Int. Cl.
*H04N 5/262* (2006.01)
*G03B 17/00* (2006.01)

(52) U.S. Cl.
USPC ...................... 348/240.99; 348/240.3; 396/72

(58) Field of Classification Search
USPC ............ 348/345–356, 42, 47, 48, 51, 333.01, 348/240.1, 240.99, 240.2, 240.3
See application file for complete search history.

(56) References Cited

U.S. PATENT DOCUMENTS

| | | | | |
|---|---|---|---|---|
| 4,231,647 A * | 11/1980 | Kitai et al. | ..................... | 396/103 |
| 5,682,198 A * | 10/1997 | Katayama et al. | ............. | 348/47 |
| 6,226,459 B1 * | 5/2001 | Hamada et al. | ................. | 396/54 |
| 6,433,824 B1 * | 8/2002 | Tanaka et al. | ................. | 348/345 |
| 6,731,339 B2 * | 5/2004 | Ohkawara | ..................... | 348/347 |
| 6,757,013 B2 * | 6/2004 | Matsuzaka | ................. | 348/240.1 |
| 6,839,086 B1 * | 1/2005 | Katagiri | ........................ | 348/347 |
| 7,289,152 B2 * | 10/2007 | Watanabe et al. | ............. | 348/357 |
| 7,305,180 B2 * | 12/2007 | Labaziewicz et al. | .......... | 396/60 |
| 7,509,041 B2 * | 3/2009 | Hosono | ........................... | 396/60 |
| 7,676,146 B2 * | 3/2010 | Border et al. | ................... | 396/80 |
| 7,680,411 B2 * | 3/2010 | Ye | ................................... | 396/334 |
| 7,738,016 B2 * | 6/2010 | Toyofuku | ................... | 348/240.1 |
| 7,856,181 B2 * | 12/2010 | Maezono | ...................... | 396/324 |
| 7,884,862 B2 * | 2/2011 | Ishii et al. | .................. | 348/240.3 |
| 8,035,725 B2 * | 10/2011 | Chen et al. | .................... | 348/349 |
| 8,089,527 B2 * | 1/2012 | Tomita | ......................... | 348/222.1 |
| 8,194,168 B2 * | 6/2012 | Mowry | ......................... | 348/335 |
| 8,363,126 B2 * | 1/2013 | Kurokawa | ................. | 348/240.3 |
| 2003/0020814 A1 * | 1/2003 | Ono | .......................... | 348/220.1 |
| 2003/0160886 A1 * | 8/2003 | Misawa et al. | ................ | 348/347 |

(Continued)

FOREIGN PATENT DOCUMENTS

JP 2002-122907 A 4/2002

*Primary Examiner* — Tuan Ho
*Assistant Examiner* — Selam Gebriel
(74) *Attorney, Agent, or Firm* — Global IP Counselors, LLP (57) ABSTRACT

A digital camera is provided with a focusing function and a focal length varying function of a main lens. The digital camera includes a main imaging unit configured to generate a main image by performing a photoelectric conversion from a subject obtained via the main lens, a sub-imaging unit configured to generate a sub-image by performing a photoelectric conversion from the subject obtained via a sub-lens, a focal length acquiring unit configured to acquire the focal length of the main lens, a magnification setting unit configured to set a level of magnification on the basis of the focal length, a composite image generating unit configured to generate a composite image by combining the main image and the sub-image, after at least one of the main image and the sub-image is magnified at the level of magnification, and an image display unit configured to display the composite image.

6 Claims, 11 Drawing Sheets

U.S. PATENT DOCUMENTS

| | | | |
|---|---|---|---|
| 2005/0134709 A1* | 6/2005 | Ishii et al. | 348/240.99 |
| 2005/0145772 A1* | 7/2005 | Abe | 250/201.2 |
| 2006/0092505 A1* | 5/2006 | Abnet et al. | 359/380 |
| 2006/0187312 A1* | 8/2006 | Labaziewicz et al. | 348/218.1 |
| 2007/0064141 A1* | 3/2007 | Misawa et al. | 348/333.01 |
| 2007/0064142 A1* | 3/2007 | Misawa et al. | 348/333.01 |
| 2008/0030592 A1* | 2/2008 | Border et al. | 348/218.1 |
| 2008/0084484 A1* | 4/2008 | Ochi et al. | 348/222.1 |
| 2008/0158346 A1* | 7/2008 | Okamoto et al. | 348/47 |
| 2008/0158384 A1* | 7/2008 | Okamoto et al. | 348/231.2 |
| 2008/0218613 A1* | 9/2008 | Janson et al. | 348/262 |
| 2009/0153649 A1* | 6/2009 | Hirooka et al. | 348/47 |

* cited by examiner

(a) FOCUS MISALIGNMENT
(INWARD)

(b) IN FOCUS (c) FOCUS MISALIGNMENT
(IN FRONT)

DIGITAL CAMERA GENERATING COMPOSITE IMAGE FROM MAIN IMAGE AND SUB-IMAGE, AND METHOD FOR MANUFACTURING SAME

CROSS-REFERENCE TO THE RELATED APPLICATIONS

This application claims priority to Japanese Patent Application No. 2009-295202 filed on Dec. 25, 2009. The entire disclosure of Japanese Patent Application No. 2009-295202 is hereby incorporated herein by reference.

BACKGROUND

1. Technological Field

The present invention relates to a digital camera and a method for manufacturing the digital camera, and particularly relates to a digital camera capable of manual focusing and of varying the focal length of a main lens, and to a method for manufacturing the digital camera.

2. Background Technology

In examples of this type of cameras presented in the past, a so-called double-image matching range finder is provided, the double-image matching range finder which includes a viewfinder optical system including a half mirror, and a range finder optical system for rotating in coupling with the manual focusing operation of an imaging lens using the principle of triangulation. Japanese Laid-open Patent Application Publication No. 2002-122907 discloses such camera, as an example. In such a camera, the image used as the viewfinder image is an image in which a range finder image inputted from the range finder optical system is superimposed, via the half mirror, on a viewfinder image inputted from the viewfinder optical system.

SUMMARY

In the camera described above, the range finder optical system must be precisely rotated in coupling with the manual focusing operation, and a complex mechanism is therefore required. In such a mechanism, high precision is required in the manufacturing tolerances and assembly in the camera for each of the components of the mechanism, and time-consuming adjustment must be performed during assembly.

A main object of the present invention is to provide a digital camera for generating a composite image in which two images are superimposed by a simple mechanism, and to provide a method for manufacturing the camera.

In order to achieve the above objects, the digital camera according to the present invention is provided.

The digital camera has a focusing function and a focal length varying function of a main lens. The digital camera includes a main imaging unit configured to generate a main image by performing a photoelectric conversion from a subject obtained via the main lens, a sub-imaging unit configured to generate a sub-image by performing a photoelectric conversion from the subject obtained via a sub-lens, a focal length acquiring unit configured to acquire the focal length of the main lens, a magnification setting unit configured to set a level of magnification on the basis of the focal length, a composite image generating unit configured to generate a composite image by combining the main image and the sub-image, after at least one of the main image and the sub-image is magnified at the level of magnification, and an image display unit configured to display the composite image.

DETAILED DESCRIPTION OF EXEMPLARY EMBODIMENTS

Figure 1:
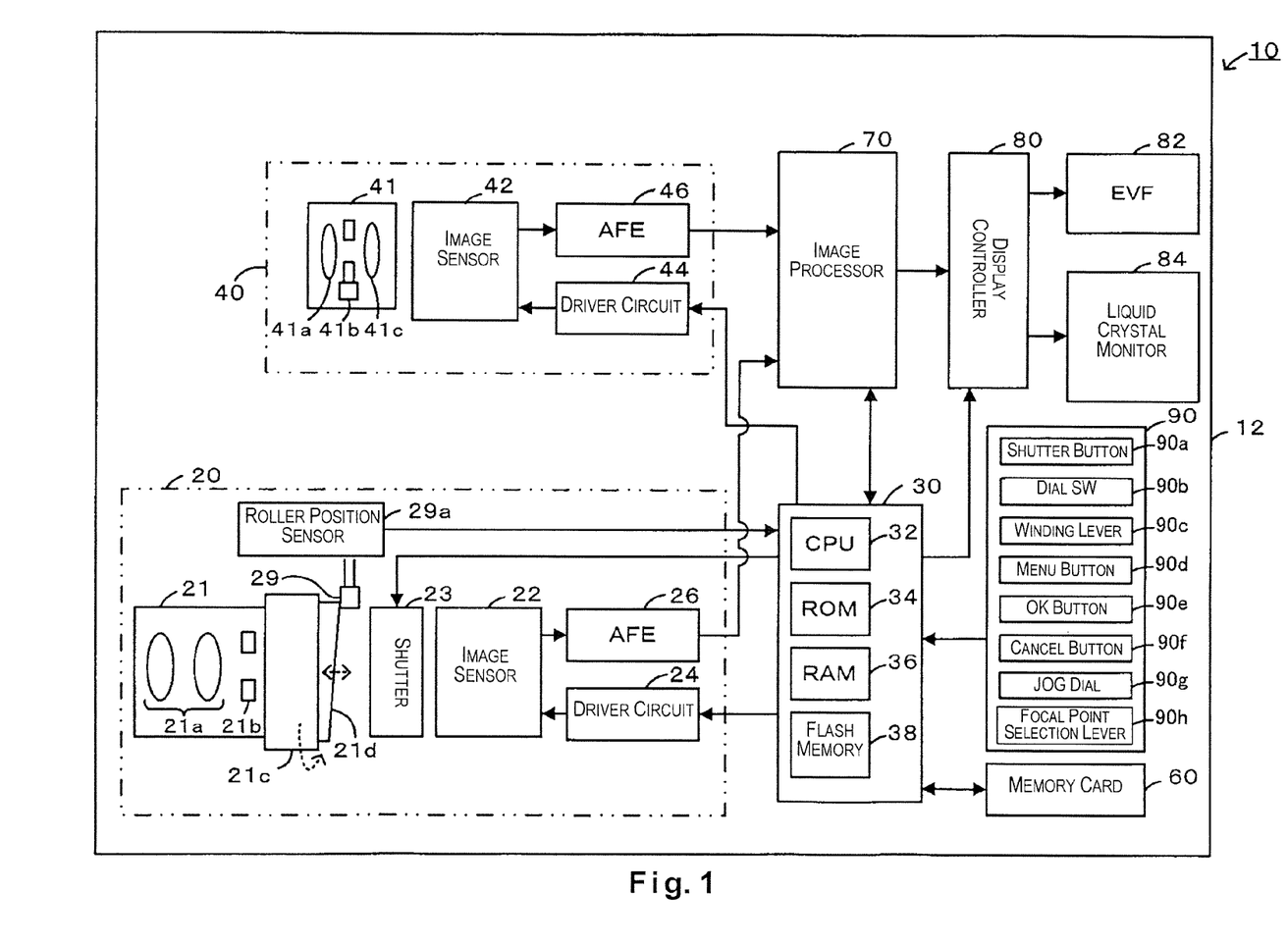
FIG. 1 is a view showing the overall configuration of the digital camera.
Figure 2:
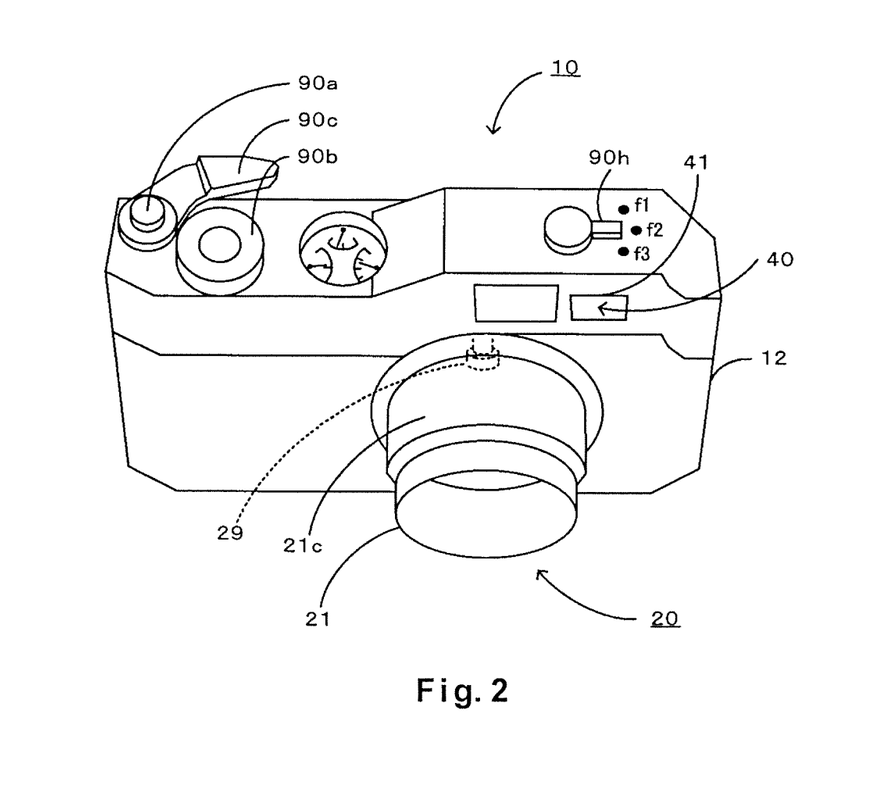
FIG. 2 is a perspective view showing the digital camera.
Figure 3:
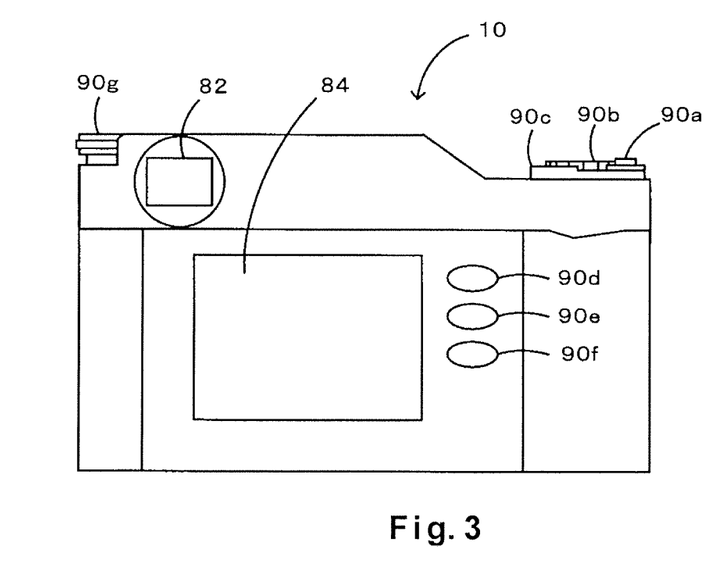
FIG. 3 is a back view showing the digital camera.

Embodiments of the present invention will next be described based on the accompanying drawings. FIG. 1 is a view showing the overall configuration of a digital camera 10 as an embodiment of the present invention, FIG. 2 is a perspective view showing the digital camera 10, and FIG. 3 is a back view showing the digital camera 10.

The digital camera 10 of the present embodiment is provided with a main body 12, a main electronic imaging unit 20 for performing a photoelectric conversion to an image of a subject and outputting a digital signal, a sub-electronic imaging unit 40 for performing a photoelectric conversion to the subject and outputting a digital signal for generating a viewfinder image, an image processor 70 for receiving as inputs the signals outputted from the main electronic imaging unit 20 and the sub-electronic imaging unit 40, performing predetermined image processing, and generating image data or an image file, a display controller 80 for displaying the image data inputted from the image processor 70 in an EVF (Electronic View Finder) 82 or a liquid crystal monitor 84, a group 90 of various types of operating switches operated by a user, a memory card 60 capable of storing an image file generated by the image processor 70, and a main controller 30 for controlling the device as a whole.

The main electronic imaging unit 20 is provided with an imaging lens 21 configured as a manual-focus lens interchangeably attached to the main body 12 via a lens mount not shown in the drawing, an image sensor 22 configured as a publicly known CCD image sensor for converting light inputted via the imaging lens mechanism 21 into an electrical signal by photoelectric conversion, a focal-plane shutter 23 disposed between the imaging lens 21 and the image sensor 22, a driver circuit 24 for driving the image sensor 22, and an analog front end (AFE) 26 for converting the electrical signal outputted from the image sensor 22 into a digital signal and outputting the digital signal. The image sensor 22 is configured as a sensor having millions to billions of pixels. A CCD image sensor is described as an example of the image sensor 22, but a CMOS-type image sensor may also be used.

The imaging lens 21 is provided with a lens group 21a including a combination of a convex lens and a concave lens, an aperture mechanism 21b for adjusting the quantity of light, a distance ring 21c rotated (for focusing) by the user to change the focal point position, and an extending part 21d formed in a helical shape so that the amount of extension thereof changes according to the operation amount (amount of rotation) of the distance ring 21c, the extending part 21d being provided on the attachment side of the imaging lens 21. The optical axis of the imaging lens 21 is parallel to the bottom surface of the main body 12. Although not shown in the drawing, a distance scale is displayed on the external peripheral portion of the distance ring 21c. The extending part 21d is in contact with a coupled roller 29 provided so as to be capable of displacement in the forward and backward directions inside the main body 12. The operation amount of the distance ring 21c is therefore converted to the displacement amount of the coupled roller 29 via the amount of extension of the extending part 21d. A roller position sensor 29a capable of detecting the displacement amount of the coupled roller 29 is installed in the digital camera 10. The operation amount of the distance ring 21c is thereby detected as the detection value of the roller position sensor 29a. Specifically, a value that reflects the focus position of the main electronic imaging unit 20 (imaging lens 21) is detected, and this detection value is used thereafter as the operation amount So.

The sub-electronic imaging unit 40 is provided with a pan-focus sub-lens 41 having a fixed focal length and having lens groups 41a, 41c and an aperture mechanism 41b, an image sensor 42 including a publicly known CCD image sensor for converting the light inputted via the sub-lens 41 into an electrical signal by photoelectric conversion, a driver circuit 44 for driving the image sensor 42, and an AFE 46 for converting the electrical signal outputted from the image sensor 42 into a digital signal and outputting the digital signal. The optical axis of the sub-electronic imaging unit 40 is parallel to the bottom surface of the main body 12. The sub-electronic imaging unit 40 and the main electronic imaging unit 20 are installed in positions separated by a predetermined interval A in the left-right (horizontal) direction of the main body 12, and by a predetermined interval B in the up-down (vertical) direction. The image sensor 22 of the main electronic imaging unit 20 is configured as a sensor having millions to billions of pixels, whereas the image sensor 42 is configured as a sensor having a number of pixels on the order of hundreds of thousands to millions.

Although not shown in the drawing, the image processor 70 is provided with various types of image processing function blocks for executing publicly known image processing for a digital camera, such as color interpolation processing for RGB pixels, white balance processing, color reproduction processing, resizing, gamma correction, and image file generation processing. The image processor 70 performs such functions as applying image processing to the input of a digital signal outputted from the main electronic imaging unit 20 and generating a main image GM, converting the generated main image GM to a predetermined format and adding imaging information to generate an image file, and applying image processing to the input of a digital signal outputted from the sub-electronic imaging unit 40 and generating a sub-image GS. The image processor 70 is provided with a cutout processing unit for executing cutout processing for cutting out a partial image from an image, a size adjustment unit for adjusting the size of the image including the cut-out partial image, and a synthesis processing unit for executing synthesis processing for superimposing one image on another image, and a viewfinder image GF for display in the EVF 82 is generated by performing synthesis processing for superimposing the partial image GSp cut out from the sub-image GS on the main image GM. The synthesis processing unit of the image processor 70 is capable of so-called α blending whereby a coefficient α indicating the transparency of the image to be superimposed on top of the bottom image is used to mix the pixel values of the bottom image with the pixel values of the top image to generate pixel values of a composite image.

The display controller 80 performs such functions as displaying the viewfinder image GF generated by the image processor 70 in the EVF 82, and displaying the main image GM generated by the image processor 70, and an image in the image file stored in the memory card 60 in the liquid crystal monitor 84. The display controller 80 is also capable of enlargement processing for enlarging a specific portion of the viewfinder image GF for display in the EVF 82.

The operating switch group 90 includes a shutter button 90a and dial switch (SW) 90b, a winding lever 90c, a mode selection button 90d, an OK button 90e, a cancel button 90f, a JOG dial 90g, a focal point selection lever 90h, and other components. The shutter button 90a is a button for receiving an instruction from a user to import an image formed on the image sensor 22 through the imaging lens 21. The dial switch 90b is a switch whereby the user sets various types of settings relating to imaging, such as the shutter speed or an exposure value. The winding lever 90c is a button for returning a shutter curtain (not shown) of the focal-plane shutter 23 from a state in which the shutter is disconnected to a state in which the next shutter operation is possible, and mechanically fixing the shutter in the ready state, by a winding operation. The mode selection button 90d is a button for selecting various modes. Selectable modes include a setting mode in which the brightness of the liquid crystal monitor 84 and various other settings are available, a correction mode for correcting the magnification rule Rb which is used to generate the viewfinder image GF, and other modes. The magnification rule will be described hereinafter. The OK button 90e is a button for determining various types of selections, and the cancel button 90f is a button for canceling a selection which has been made. The JOG dial 90g, when rotated, moves a cursor for selecting various items displayed on the liquid crystal monitor 84, and changes the numerical values of various types of settings. The JOG dial 90g can either be drawn upward or pressed downward, and functions as a dial for scrolling the image displayed on the liquid crystal monitor 84 up and down when the dial is rotated in the upward-drawn state, and as a dial for scrolling the image left and right when the dial is rotated in the downward-pressed state, for example. The focal point selection lever 90h is a lever for selecting the focal length f of the attached imaging lens 21. As shown in FIG. 2, the focal point selection lever 90h enables selection of any of three focal lengths f1, f2, f3, and is placed in the position of the corresponding focal length f by the user when the imaging lens 21 is replaced.

The main controller 30 is configured as a microprocessor centered around a CPU 32, and is provided with a ROM 34 for storing a processing program and various types of tables, a RAM 36 for temporarily storing data, a flash memory 38 for retaining data in rewritable fashion even when the power supply is turned off, and an input/output port and communication port not shown in the drawing. A cutout rule Rk or magnification rule Rb used to generate the viewfinder image GF is registered in the flash memory 38. Various operating signals from the operating switch group 90, the operation amount So from the coupled roller 29, image files read from the memory card 60, various images from the image processor 70, and other information is inputted to the main controller 30. From the main controller 30 are outputted a shutter drive signal to the focal-plane shutter 23, control signals to the driver circuits 24, 44, image files to be written to the memory card 60, image processing commands to the image processor 70, display control commands to the display controller 80, and other information.

Figure 4:
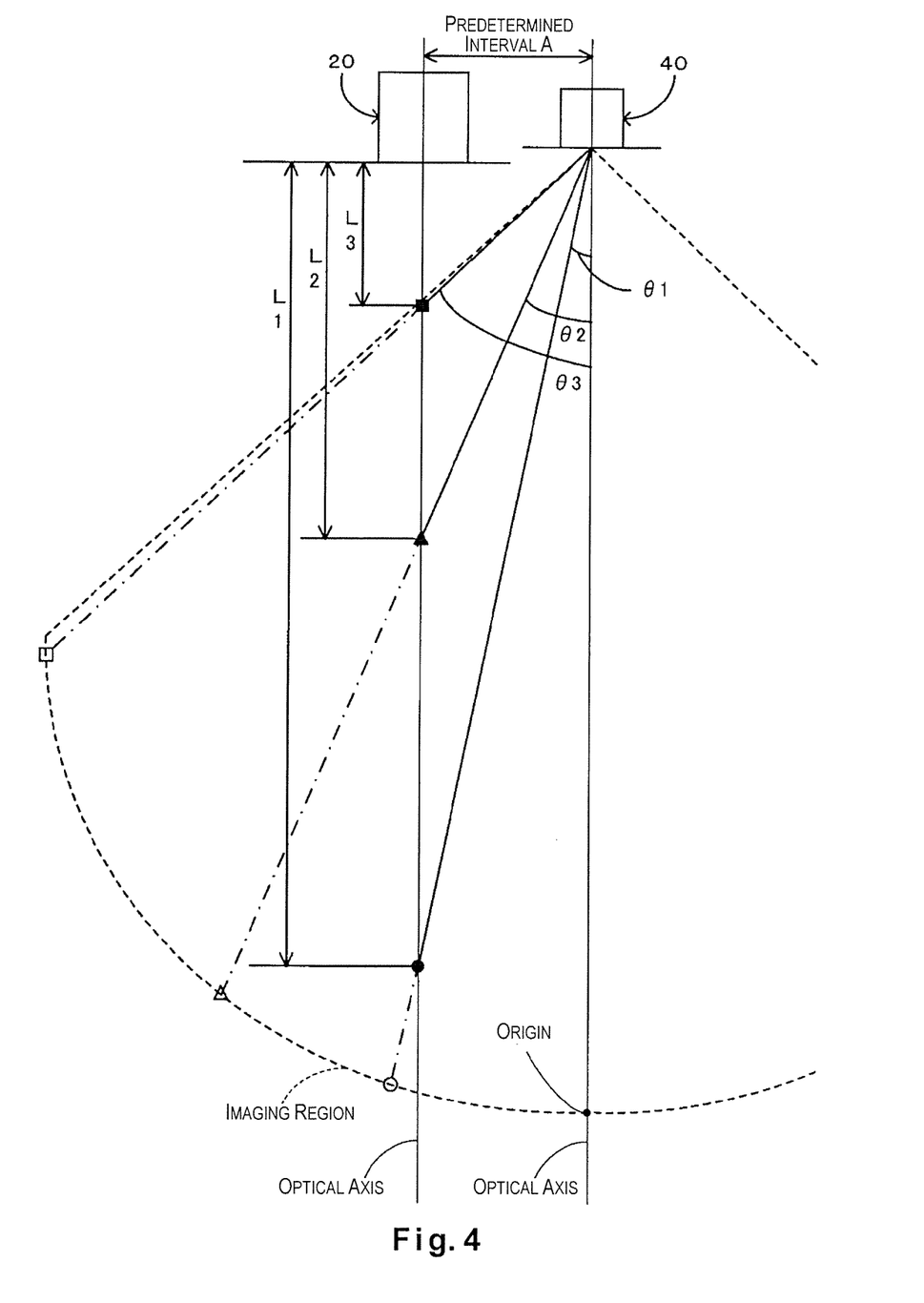
FIG. 4 is a view showing the concept of the method for generating the cutout rule.
Figure 5:
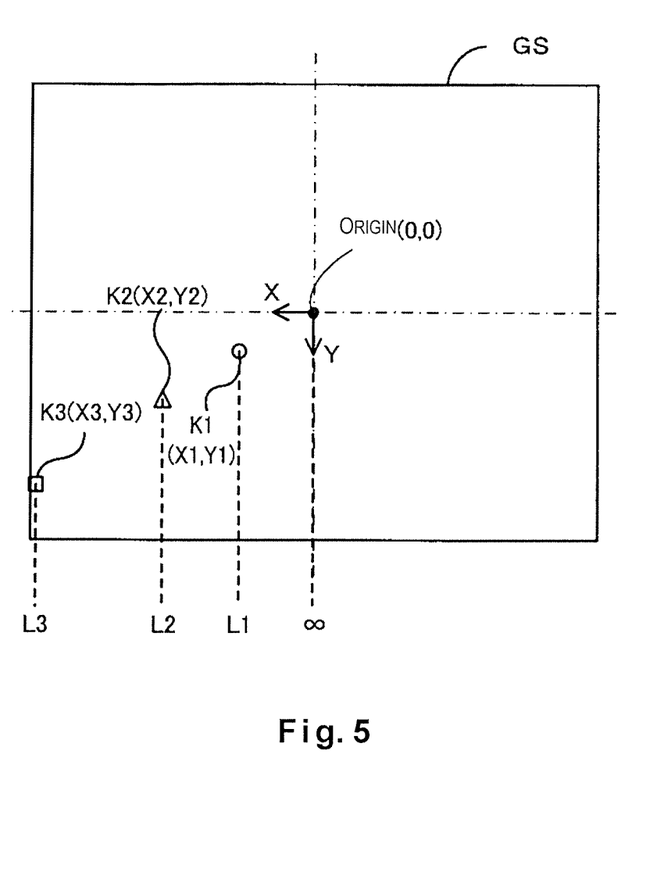
FIG. 5 is a view showing an example of the cutout position in the sub-image.

The cutout rule Rk and the magnification rule Rb will next be described. The cutout rule Rk will first be described. The cutout rule Rk is a rule for setting the cutout position K at which a partial image is cut out from the sub-image GS in accordance with a focusing operation in order to generate the viewfinder image GF. FIG. 4 is a view showing the concept of the method for generating the cutout rule Rk, and FIG. 5 is a view showing an example of the cutout position K in the sub-image GS. FIG. 4 shows the positional relationship between the main electronic imaging unit 20 and the sub-electronic imaging unit 40 as viewed from above, and the interval between the imaging units is the predetermined interval A described above. The region indicated by dotted lines in FIG. 4 represents the image in the imaging region of the sub-electronic imaging unit 40. As shown in FIG. 4, a subject (indicated by a black circle in FIG. 4, the same hereinafter) in a position at a distance L1 on the optical axis of the main electronic imaging unit 20 is photographed at a position (indicated by a white circle) of an imaging region at an angle θ1 from the optical axis of the sub-electronic imaging unit 40. In the same manner, a subject (indicated by a black triangle) at a distance L2 is photographed at a position (indicated by a white triangle) at an angle θ2, and a subject (indicated by a black square) at a distance L3 is photographed at a position (indicated by a white square) at an angle θ3. The angles θ, distances L, and the predetermined interval A are related by Equation (1) according to a triangulation principle, and since the predetermined interval A is a known constant, the angles θ can be calculated when the distances L are determined. The positional relationship between the imaging units as viewed from the side is not shown, but because the interval between the imaging units in the up-down direction is the predetermined interval B described above, the positional relationship between the imaging units in the up-down direction is expressed by Equation (2) in the same manner as Equation (1) when the angle φ is used instead of the angle θ. As shown in FIG. 5, when an XY coordinate system having the center of the sub-image GS (imaging region) as the origin is set with the X axis in the left-right direction and the Y axis in the up-down direction of FIG. 5, the position of the subject image in the sub-image GS moves farther from the origin the closer the distance is from the digital camera 10 to the subject, and closer to the origin the farther the digital camera 10 is from the subject, and the position of the subject image coincides with the origin when the subject is at infinite distance. In order to match the left-right direction of the imaging region shown in FIG. 4, FIG. 5 shows the sub-image GS with left and right reversed from the original image, for the sake of convenience. The subject image positioned at distance L1 appearing at the center of the main image GM is therefore shown in the sub-image GS centered at position K1 (X1, Y1), which corresponds to distance L1. The operation amount of the distance ring 21c, which changes according to the distance to the subject, is detected as the operation amount So by the roller position sensor 29a, and the distance L can therefore be derived based on the operation amount So. Therefore, the distance L can be derived from the operation amount So, and the angles θ and φ can be calculated from the derived distance L and Equations (1) and (2). By setting the relationship between the angle θ and the X coordinate, and the relationship between the angle φ and the Y coordinate in advance, the X coordinate value that corresponds to the angle θ, and the Y coordinate value that corresponds to the angle φ, i.e., the cutout position K, can be derived. In the present embodiment, the relationship between the operation amount So and the cutout position K is stored as the cutout rule Rk. This cutout rule Rk is stored as a relational expression with respect to the operation amount So and the cutout position K, and in the case of calculating the cutout position K, this relational expression is used to calculate the cutout position K from the operation amount So. The maximum values of the angles θ, φ are determined by the angle of view of the sub-lens 41, and the relationship between the angle θ and the X coordinate, and the relationship between the angle φ and the Y coordinate can be set from the corresponding X, Y coordinate values.

$$\tan\theta = A/L \quad (1)$$

$$\tan\phi = B/L \quad (2)$$

Figure 6:
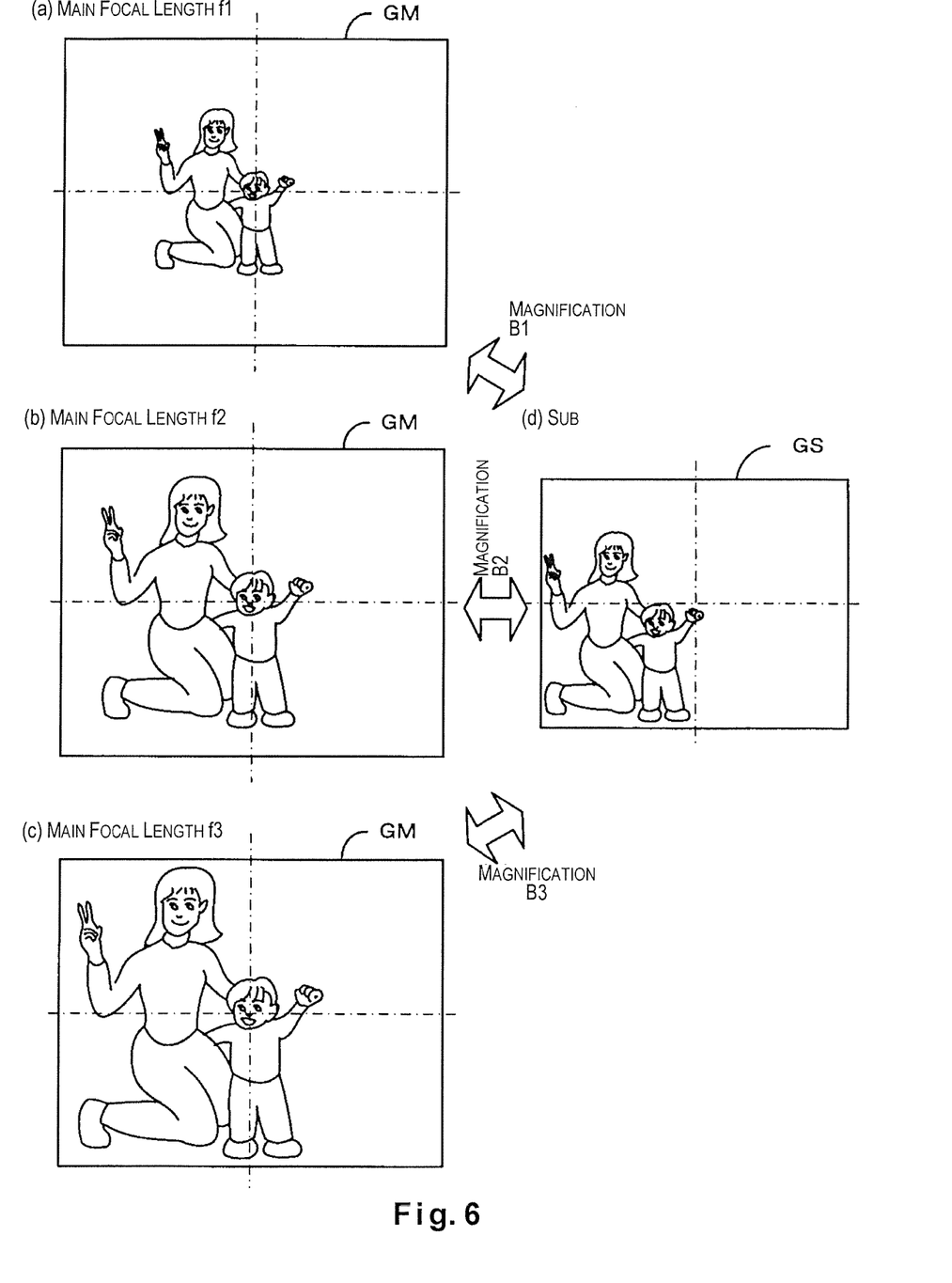
FIG. 6 is a view showing the concept of the method for generating the magnification rule Rb.

The magnification rule Rb will next be described. The magnification rule Rb is a rule for setting the magnification with respect to the sub-image GS so that the subject appears as the same size in the sub-image GS and the main image GM. FIG. 6 is a view showing the concept of the method for generating the magnification rule Rb. FIGS. 6(a) through 6(c) show the main image GM, and FIG. 6(d) shows the sub-image GS. The left and right of the sub-image GS are reversed in FIG. 6(d) as well, the same as in FIG. 5. As described above, since an image sensor 22 and an image sensor 42 having different numbers of pixels are used in the main electronic imaging unit 20 and the sub-electronic imaging unit 40, respectively, the main image GM and the sub-image GS are of different sizes, as shown in the drawings. Lenses 21 having different focal lengths f can be used interchangeably in the main electronic imaging unit 20, and since the angle of view changes when the focal length f changes, the size of the subject appearing in the main image GM also changes according to the focal length f1, f2, f3, as shown in FIGS. 6(a) through 6(c). A magnification rule Rb in which adjustment magnifications B for aligning the size of the subject image in the sub-image GS with the size of the subject image in the main image GM are set as magnifications B1, B2, B3 and correlated with the focal lengths f1, f2, f3 is generated based on the difference in size between the main image GM and the sub-image GS, and the relationship between the focal lengths f1, f2, f3 of the imaging lens 21 and the focal length of the sub-lens 41.

Figure 7:
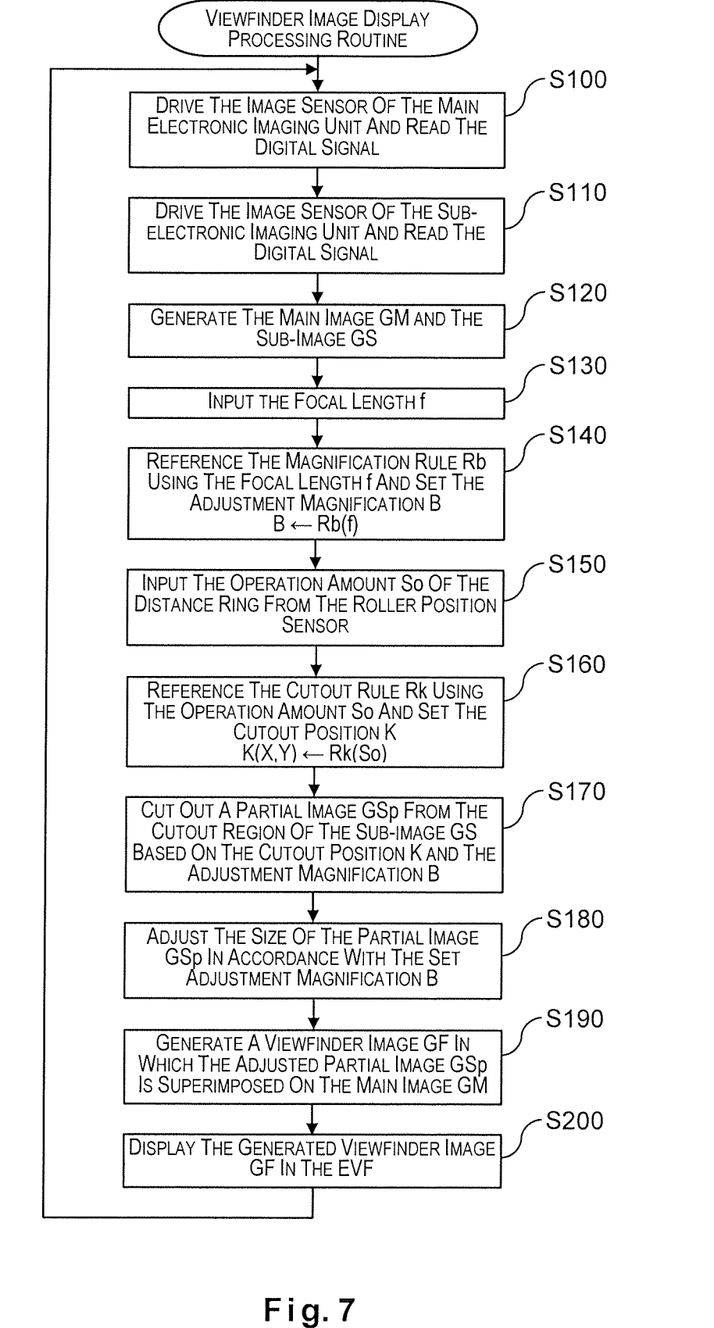
FIG. 7 is a flowchart showing an example of the viewfinder image display processing routine.

The operation of the digital camera 10 of the present embodiment thus configured will next be described. FIG. 7 is a flowchart showing an example of the viewfinder image display processing routine executed by the main controller 30. This routine is executed from the time a power supply button (not shown) is switched on and an imaging mode is started until the power supply button is switched off. Image processing, display control, and other processing is actually performed mainly by the image processor 70 and the display controller 80, but no particular distinction is made between main areas of processing in the following description. When the viewfinder image display processing routine is executed, the main controller 30 first drives the image sensor 22 of the main electronic imaging unit 20 and reads the digital signal thereof (step S100), and drives the image sensor 42 of the sub-electronic imaging unit 40 and reads the digital signal thereof (step S110). Various types of image processing are then applied to the read digital signals to generate the main image GM and the sub-image GS (step S120). When the main image GM and sub-image GS are generated, the focal length f of the currently attached imaging lens 21 is inputted (step S130). The focal length among the focal lengths f1 through f3 selected by the focal point selection lever 90*h* is inputted. The inputted focal length f is used to set the adjustment magnification B with reference to the magnification rule Rb (step S140). The operation amount So of the distance ring 21*c* is then inputted from the roller position sensor 29*a* (step S150), and the inputted operation amount So is used to set the cutout position K with reference to the cutout rule Rk (step S160).

Figure 8:
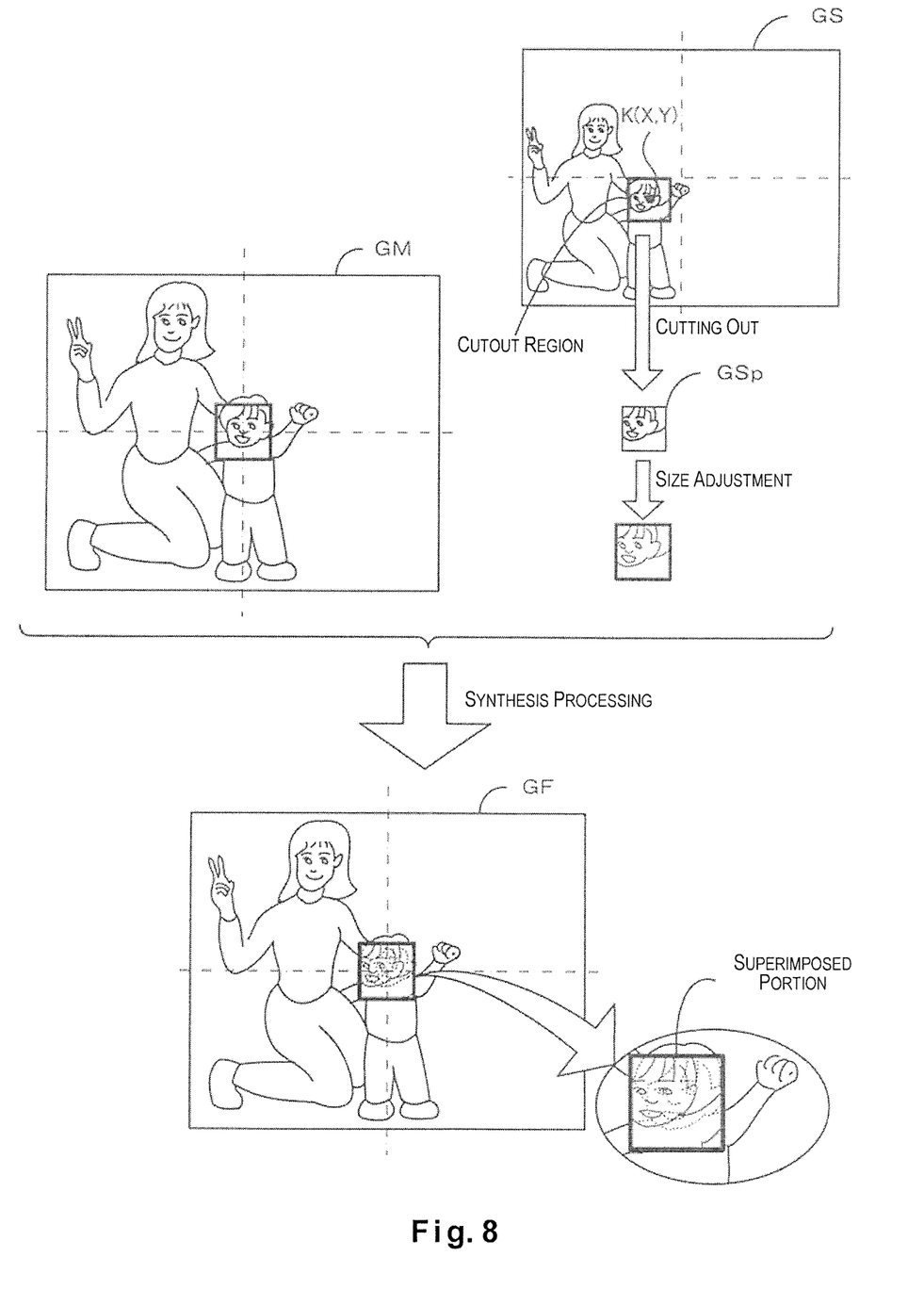
FIG. 8 is a view showing the generated viewfinder image.

When the adjustment magnification B and the cutout position K are thus set, a partial image GSp is cut out from a cutout region having a size based on the adjustment magnification B, at a position based on the cutout position K in the sub-image GS (step S170), and a size adjustment in accordance with the adjustment magnification B is applied to the cut-out partial image GSp (step S180). Since the adjustment magnification B is set by referencing the magnification rule Rb using the focal length f, the subject appearing in the size-adjusted partial image GSp is of the same size as the subject appearing in the main image GM. A viewfinder image GF is generated, wherein the partial image GSp, the size of which has been adjusted as described above, is superimposed in the center of the main image GM (step S190). The viewfinder image GF is generated by generating pixel values of the superimposed portion by alpha blending in which the pixel values s of the partial image GSp and the pixel values m of the main image GM are mixed based on a coefficient α for indicating the transparency of the top sub-image GS with respect to the bottom main image GM. The pixel values m of the main image GM are used to generate the portion outside the superimposed portion. FIG. 8 is a view showing the generated viewfinder image GF. As shown in FIG. 8, the superimposed portion of the viewfinder image GF is generated as a double image by alpha blending. In the superimposed portion, the partial image GSp cut out from the sub-image GS is indicated by solid lines, and the main image GM is indicated by dotted lines.

Figure 9:
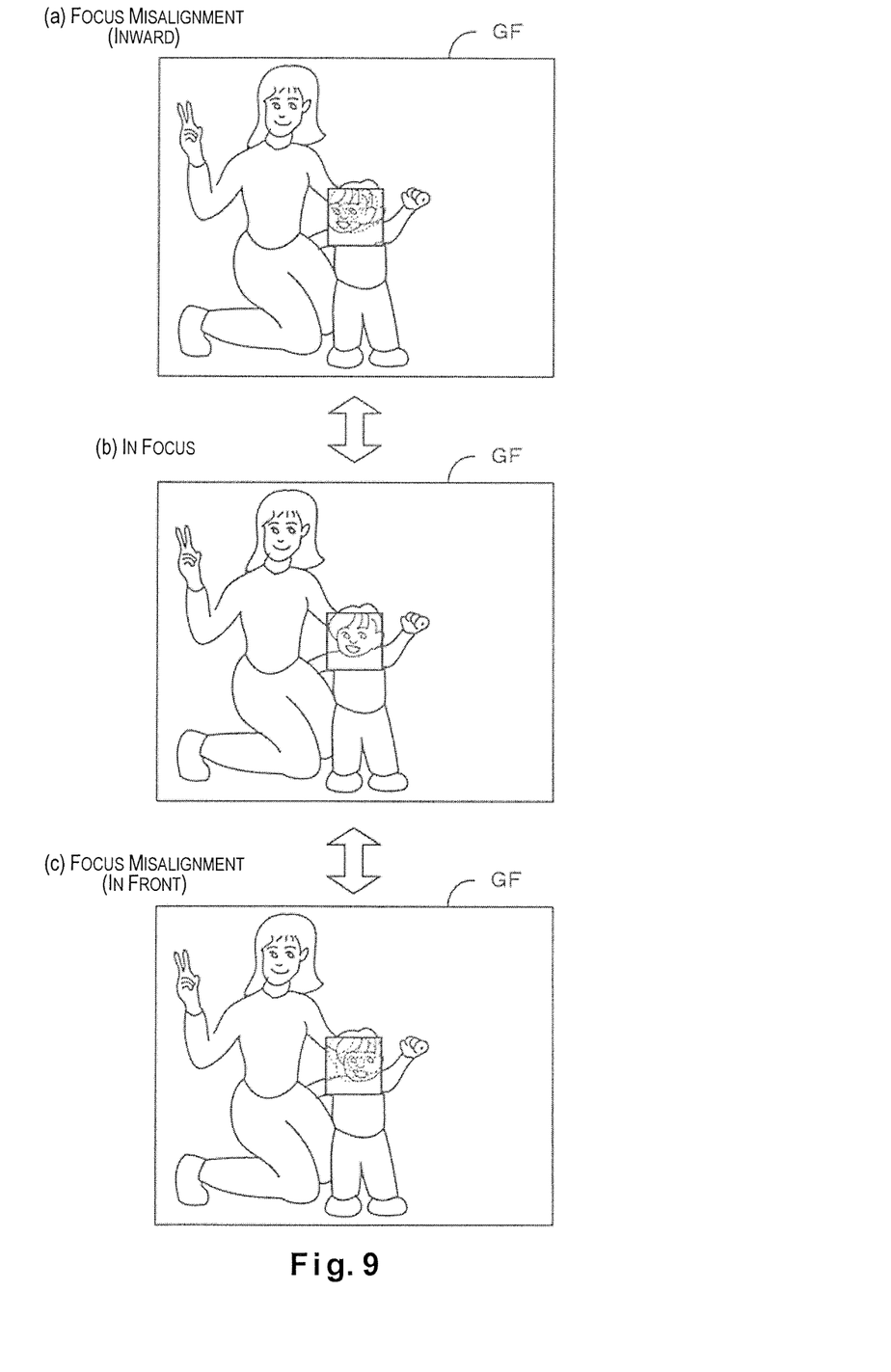
FIG. 9 is a view showing the relationship between the misalignment of the finder image and the focus.

When the viewfinder image GF is generated in this manner, the generated viewfinder image GF is displayed in the EVF 82 (step S200), the process returns to step S100 and repeats. The magnification rule Rb is referenced using the focal length f of the imaging lens 21 to set the adjustment magnification B, the cutout rule Rk is referenced using the operation amount So from the roller position sensor 29*a*, which reflects the focus position of the main electronic imaging unit 20, to set the cutout position K, and the partial image GSp cut out from the set cutout position K is adjusted in size in accordance with the adjustment magnification B, after which a viewfinder image GF can be displayed, wherein the partial image GSp is superimposed on the main image GM. A viewfinder image GF can therefore be generated, wherein the double image of the superimposed portion changes in conjunction with adjusting the focus of the main electronic imaging unit 20. FIG. 9 is a view showing the relationship between the misalignment of the viewfinder image GF and the focus. In FIG. 9(*b*), there is no misalignment in the superimposed portion, but this means that a partial image GSp of the correct position is cut out from the subject image in the sub-image GS, and the subject is in focus. In FIGS. 9(*a*) and 9(*c*), however, the misalignment which occurs in the superimposed portion means that a partial image GSp of an offset position is cut out from the subject image in the sub-image GS, and the subject is out of focus. In FIG. 9(*a*), the focus is shifted inward from the subject, and in FIG. 9(*c*), the focus is shifted in front of the subject. The user can thus adjust the focus while confirming the misalignment of the superimposed portion of the viewfinder image GF. Since the partial image GSp is superimposed in the viewfinder image GF by primarily using the main image GM in this instance, a viewfinder image GF can be generated. There is no parallax in the view finder image GF with respect to the main image GM. Since the partial image GSp is also superimposed on the main image GM after the focal length f of the currently attached imaging lens 21 is used to adjust the size of the partial image GSp, no size difference occurs between the images in the superimposed portion.

Figure 10:
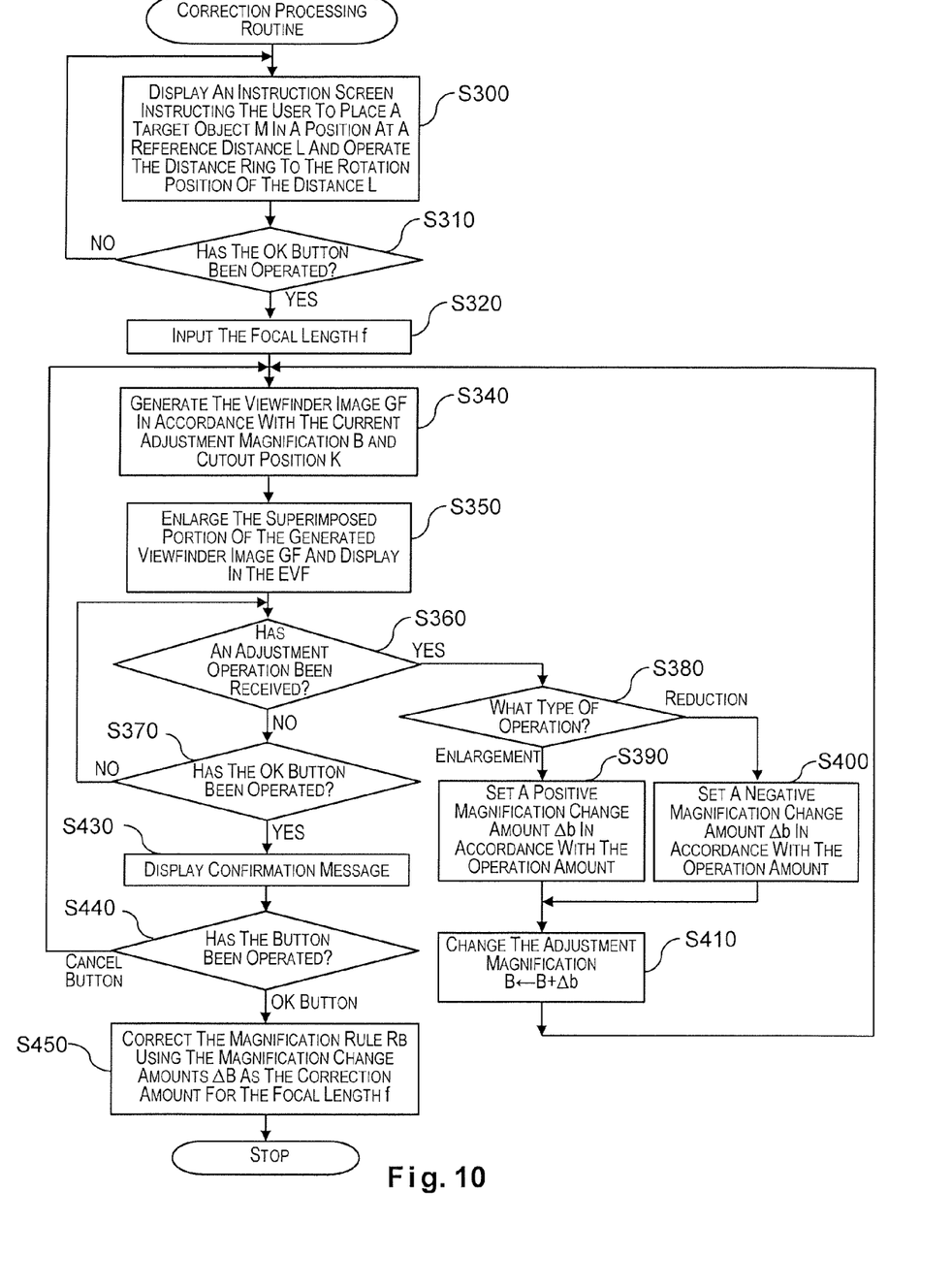
FIG. 10 is a flowchart showing an example of the correction processing routine.
Figure 11:
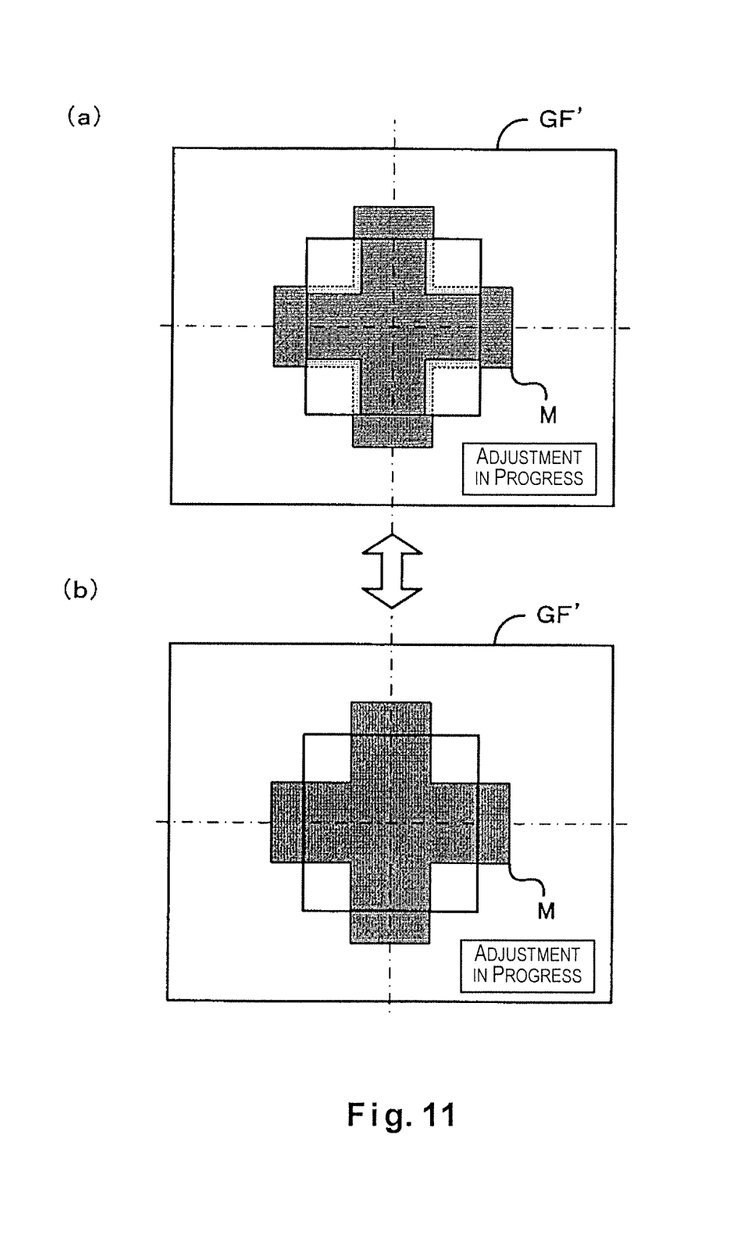
FIG. 11 is a view showing an example of the finder image in the adjustment mode.

The operation of the digital camera 10 during correction of the magnification rule Rb by the user will next be described. FIG. 10 is a view showing an example of the correction processing routine executed by the main controller 30. This processing is executed when the correction mode is selected by operation of the mode selection button 90*d* by the user. In the following description, the cutout position K is assumed to be normal in the correction of the adjustment magnification B. When this correction processing routine is executed, the main controller 30 displays an instruction screen on the liquid crystal monitor 84 instructing the user to first place a target object M in a position at a reference distance L, and operate the distance ring 21*c* so that the distance scale thereof is at the rotation position indicating the distance L, and then to press the OK button 90*e* once the above operations are completed (step S300). The process then waits for the OK button 90*e* to be operated by the user (step S310). When the OK button 90*e* is operated, the focal length f of the currently attached imaging lens 21 is inputted (step S320). As described above, the focal length selected by the focal point selection lever 90*h* is inputted. When the focal length f is thus inputted, a viewfinder image GF is generated in accordance with the current adjustment magnification B and cutout position K (step S340). This processing is performed in the same manner as the viewfinder image display processing routine described above. The adjustment magnification B at this time is a magnification which is set by using the inputted focal length f to reference the magnification rule Rb. A viewfinder image GF' in which the superimposed portion of the generated viewfinder image GF is enlarged is then displayed in the EVF 82 (step S350). FIG. 11 is a view showing an example of the viewfinder image GF' in the correction mode. As shown in FIG. 11, the superimposed portion is enlarged in the display, and a message is displayed indicating that adjustment is in progress. Under ordinary circumstances, a viewfinder image GF' is displayed, wherein there is no size difference in the superimposed portion, as shown in FIG. 11(*b*). However, when the positions of the main electronic imaging unit 20 and sub-electronic imaging unit 40 are offset due to some abnormality, a size difference can occur in the superimposed portion, as shown in FIG. 11(*a*).

When the viewfinder image GF' is thus displayed, the process waits for an adjustment operation by the JOG dial 90*g* (step S360) or operation of the OK button 90*e* (step S370). When an adjustment operation occurs, a determination is made as to whether the adjustment is for enlargement or reduction (step S380). For example, when the JOG dial 90*g* is rotated to the right, the adjustment is determined to be for enlargement, and when the JOG dial 90*g* is rotated to the left, the adjustment is determined to be for reduction. When the adjustment is determined to be for enlargement, a magnification change amount Δb having a positive value is set in accordance with the operation amount of the JOG dial 90*g* (step S390), and when the adjustment is determined to be for reduction, a magnification change amount Δb having a negative value is set in accordance with the operation amount of the JOG dial 90*g* (step S400). The magnification change amount Δb is added to the current adjustment magnification B to change the adjustment magnification B (step S410).

When the adjustment magnification B is changed in this manner, the process returns to step S340 and repeats, so that adjustment operations from the user are repeatedly received until a size difference in the viewfinder image GF' is no longer confirmed. When a determination is made in step S370 that the OK button 90e has been operated, a confirmation message inquiring whether to correct the magnification rule Rb according to the current adjustment magnification B is displayed in the EVF 82 (step S430), and the process waits for a button operation (step S440). When the cancel button 90f is operated in step S440, the process returns to step S340 and repeats. On the other hand, when the OK button 90e is pressed in step S440, the magnification rule Rb is corrected by using a magnification change amount ΔB (the cumulative value of the magnification change amount Δb) as a correction value for the inputted focal length f (step S450), and the routine is completed. Now, we think about a case in which the inputted focal length f is the focal length f2, for example, for the correction of the magnification rule Rb. In this case, the magnification change amount ΔB is first added as the correction amount to the adjustment magnification B2 of the focal length f2. For the adjustment magnification B1 of the focal length f1, a magnification change amount ΔB which is in accordance with the ratio of the adjustment magnification B2 and the adjustment magnification B1 is added as the correction amount. The same principle applies for the adjustment magnification B3 of the focal length f3. It is thus possible for the user to correct the magnification rule Rb by a simple method. A magnification change amount ΔB may also be acquired for each of a plurality of focal lengths, and the magnification rule Rb may be corrected based on the acquired magnification change amounts ΔB.

Figure 12:
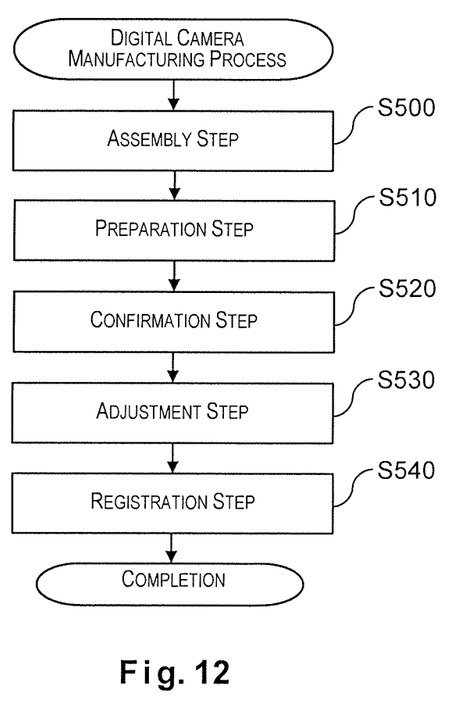
FIG. 12 is a view showing an example of the steps for manufacturing the digital camera.

The magnification rule Rb of the digital camera 10 at the time of shipping reflects individual differences in each digital camera 10, and is registered in the process of manufacturing the digital camera 10. This process will be described hereinafter along with the method for manufacturing the digital camera 10. FIG. 12 is a view showing an example of the manufacturing process of the digital camera 10. In the manufacturing process of the digital camera 10, the constituent parts are first assembled in the main body 12 (step S500). In this assembly step, the main electronic imaging unit 20, the sub-electronic imaging unit 40, the image processor 70, the display controller 80, the EVF 82, the liquid crystal monitor 84, the operating switch group 90, the main controller 30, and other components are installed in the main body 12. At this time, a default adjustment magnification for each focal length is registered as the magnification rule Rb in the flash memory 38. When the digital camera 10 is thus assembled, preparation is made for generating the magnification rule Rb (step S510). In this preparation step, a power button (not shown) of the digital camera 10 is switched on, the digital camera 10 is fixed to a tripod or the like, a target object M is placed in a position at a predetermined distance L from the fixed digital camera 10, the focal point selection lever 90h is operated to coincide with the focal length f (the focal length f1 in this case) of the currently attached imaging lens 21, and the distance ring 21c is rotated to the position at which the distance scale indicated thereon shows the distance L. At this time, the switching on of the power button of the digital camera 10 causes the viewfinder image display processing routine described above to be executed. A viewfinder image GF generated in accordance with the default adjustment magnification corresponding to the cutout position K and the focal length f1 is therefore displayed in the EVF 82.

When the viewfinder image GF is thus displayed, the size difference of the superimposed portion of the displayed viewfinder image GF is confirmed (step S520). A slight size difference may occur in the superimposed portion at this time due to individual differences between digital cameras 10. Individual differences between digital cameras 10 occur due to manufacturing or assembly error in the main electronic imaging unit 20, the sub-electronic imaging unit 40, and other parts, or to such factors as the characteristics of the image sensors 22, 42. When a size difference is confirmed in the confirmation step, magnification adjustment is performed until the size difference can no longer be confirmed (step S530). This magnification adjustment is performed in the same manner as the adjustment processing in the correction processing routine shown in FIG. 10. When a size difference can no longer be confirmed, a magnification rule Rb is generated using the adjustment amount for the focal length f1 and registered in the flash memory 38 (step S540). The magnification rule Rb is generated in the same manner as the magnification rule Rb is corrected in the correction processing routine shown in FIG. 10, by adding the adjustment amount for the focal length f1 in accordance with the ratio thereof to the adjustment magnification for each focal length. Size differences that accompany individual differences due to assembly error and other factors in the digital camera 10 can thereby be eliminated, and a highly precise magnification rule Rb can be generated and registered.

The correlation between constituent elements of the present embodiment and constituent elements of the present invention will next be clarified. The EVF 82 of the present embodiment is an example of an image display unit. The main electronic imaging unit 20 is an example of a main imaging unit. The sub-electronic imaging unit 40 is an example of a sub-imaging unit. The focal point selection lever 90h in an example of the focal length acquiring unit. The main controller 30 is an example of the magnification setting unit. The combination of the main controller 30 and image processor 70 is an example of a composite image generation unit. The display controller 80 is an example of the display control unit. The JOG dial 90g is an example of the instruction receiving unit. The main controller 30 is an example of the correcting unit.

According to the digital camera 10 of the present embodiment described in detail above, the focal length f of the currently attached imaging lens 21 is acquired, the magnification rule Rb is referenced using the acquired focal length f to set an adjustment magnification B, the size of a partial image GSp cut out from a predetermined position of the sub-image GS is adjusted in accordance with the set adjustment magnification B so as to be the same size as the main image GM, a viewfinder image GF is then generated by superimposing the partial image GSp on the main image GM. The generated viewfinder image GF is displayed in the EVF 82. A viewfinder image GF in which the two images are superimposed can therefore be generated and displayed by a simple configuration without the use of a complex mechanism.

By configuring the correction mode so that the magnification rule Rb is corrected in accordance with a magnification change amount set by a user operation, the magnification rule Rb can be corrected by the user. Since the superimposed portion of the viewfinder image GF' in the correction mode is enlarged in the display, size difference is easily confirmed, and the magnification rule Rb can be smoothly corrected. Furthermore, since the operation amount So of manual focusing is acquired to set the cutout position K of the partial image GSp with reference to the cutout rule Rk, it is possible to confirm whether the subject is in focus by confirming positional misalignment of the superimposed portion.

The present invention shall not be construed as being limited by the embodiment described above, and various embodiments of the present invention are possible within the technical scope of the present invention.

In the embodiment described above, the viewfinder image GF is displayed in the EVF 82, but the present invention is not limited to this configuration, and the viewfinder image GF may be displayed on the liquid crystal monitor 84.

In the embodiment described above, a correction amount for a single focal length is reflected for each focal length, but the present invention is not limited to this configuration, and a configuration in which the result of adjusting the adjustment magnification B for each focal length is reflected for each focal length may be available.

In the embodiment described above, a partial image GSp is cut out from the sub-image GS, and the size of the partial image GSp is adjusted, but the present invention is not limited to this configuration. The partial image GSp can be cut out after the size of the sub-image GS is first adjusted. Size adjustment is also not limited to being performed for the sub-image GS, and may also be performed for the main image GM.

In the embodiment described above, a case in which the sub-image GS is of a smaller size than the main image GM is described, but the present invention is not limited to this configuration, and the sub-image GS and the main image GM may be the same size, or the sub-image GS may be larger than the main image GM. The partial image GSp cut out from the sub-image GS is also described above as being combined with the main image GM, but the sub-image GS may also be combined without having a partial image cut therefrom.

In the embodiment described above, the focal length f of the imaging lens 21 is selected from three focal lengths f1 through f3 by the focal point selection lever 90h, but the present invention is not limited to this configuration, and the focal length f may be selected from four or more focal lengths. Alternatively, a configuration in which the user inputs a numerical value for the focal length may be available. The focal length may be acquired by using an electrical communication means or the like from the imaging lens 21 without the intervention of the user. The imaging lens 21 may also be a zoom lens, and when a zoom lens is attached, the focal length at that time is preferably downloaded by an electrical communication means or the like to set the adjustment magnification B. When a zoom lens is attached, the magnification rule Rb should be continuously changed, and when the magnification rule Rb is stored as a relational expression to calculate the magnification, the adjustment magnification B is preferably calculated by using the relational expression.

In the embodiment described above, the amount of rotation of the distance ring 21c is detected via the coupled roller 29, but the amount of rotation may also be directly detected by detecting the rotation angle of the distance ring 21c.

In the embodiment described above, the magnification rule Rb is a rule in which the focal length f and the magnification are correlated, but the magnification rule Rb may be a rule in which the focal length f, the distance to the subject acquired from the roller position sensor 29a, and the magnification are correlated. Through this configuration, even when the size of the subject appearing in the main image GM is dependent on the distance to the subject, it is possible to match the size of the subject image in the partial image GSp and the size of the subject image in the main image GM.

In the embodiment described above, the viewfinder image GF is generated by using a blending to superimpose the partial image GSp on the main image GM without modification thereof, but a configuration in which the viewfinder image GF is generated by using a blending to superimpose the partial image GSp on the main image GM after changing the color of at least one of the partial image GSp and the main image GM may be available. In this case, the partial image GSp or the image of the superimposed portion of the main image GM may be displayed in monochrome or in an amber color or other color. The partial image GSp and the image of the superimposed portion of the main image GM can thereby be more easily distinguished.

In the embodiment described above, the cutout position K and the cutout region are established without consideration for rotation about the optical axis in the main electronic imaging unit 20 or the sub-electronic imaging unit 40, but a configuration in which the cutout position K and cutout region reflect rotation about the optical axis in the main electronic imaging unit 20 or the sub-electronic imaging unit 40 may be available, and misalignment in the rotation direction does not occur in the superimposed portion when the subject is in focus. In this case, the cutout rule Rk preferably includes information corresponding to the rotation.

In the embodiment described above, adjustment during generation or correction of the magnification rule Rb is performed based on manual operation of the JOG dial 90g by an operator or user, but the present invention is not limited to this configuration, and adjustment may also be performed automatically. For example, an auto-focusing operation can be employed instead of the manual focusing operation. The same images include the main image GM, the sub-image GS, and the composite image can be displayed on a camera which performs the auto-focusing operation.

Next, a method for manufacturing a digital camera 10 is described. The method is for manufacturing the digital camera 10 with a manual focusing function and of a focal length varying function of a main lens. The method for manufacturing the digital camera 10 includes an assembly step, a preparation step, an adjustment step, and a registration step.

The assembly step is for assembling image display means for displaying an image, main imaging means for applying a photoelectric conversion to an image of a subject obtained via a main lens (imaging lens 21) and generating a main image GM, sub-imaging means for applying a photoelectric conversion to an image of a subject obtained via a sub-lens 41 and generating a sub-image GS, focal length acquiring means for acquiring the focal length of the main lens 21, magnification setting means for setting the magnification of the image on the basis of the acquired focal length of the main lens 21 so that the image of the subject in the main image GM and the image of the subject in the sub-image GS are substantially the same size, composite image generating means for generating a composite image in which the main image GM and the sub-image GS are superimposed, in conjunction with zoom processing of at least one of the main image GM and the sub-image GS at the set magnification, display control means for controlling the display means so as to display the generated composite image, and storage means for storing various types of data.

The preparation step of changing the focal length of the main lens 21 to a predetermined focal length.

The adjustment step is for performing an adjustment with respect to the set magnification so that the size difference is less than or equal to a predetermined value when the composite image is generated by the composite image generating means and a size difference is identified in the generated composite image.

The registration step is for generating a magnification rule in which the predetermined focal length and the magnification are correlated, and registering the generated magnification rule in the storage means on the basis of the magnification that is set when the size difference is less than or equal to a predetermined value.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A digital camera having a focusing function and a focal length varying function of a main lens, the digital camera comprising:
    a main imaging unit configured to generate a main image by performing a photoelectric conversion from a subject obtained via the main lens;
    a sub-imaging unit configured to generate a sub-image by performing a photoelectric conversion from the subject obtained via a sub-lens;
    a focal length acquiring unit configured to acquire the focal length of the main lens;
    a magnification setting unit configured to set a level of magnification on the basis of the focal length;
    a composite image generating unit configured to generate a composite image by combining the main image and the sub-image, after at least one of the main image and the sub-image is magnified at the level of magnification;
    an image display unit configured to display the composite image; and
    wherein the magnification setting unit is configured to set the level of the magnification in order to match substantially a size of the main image and a size of the sub-image.

2. The digital camera according to claim 1, wherein the sub-lens is a pan-focus lens.

3. The digital camera according to claim 1, wherein
    the magnification setting unit is configured to set the level of the magnification in a correction mode in which a predetermined magnification rule applies in setting the level of the magnification, and
    the digital camera further includes
    an instruction receiving unit configured to receive an instruction to change the level of the magnification such that difference between the size of the main image and the size of the sub-image in the composite image is less than or equal to a predetermined amount in the correction mode, and
    a correcting unit configured to correct the magnification rule by using amount to change the level of the magnification as amount of correction in the correction mode, when the focal length of the main lens is in predetermined length.

4. The digital camera according to claim 1, further comprising
    an focusing amount acquiring unit configured to acquire amount of the focusing, wherein
    the composite image generating unit is configured to generate the composite image by combining the main image and the sub-image by setting a cutout position on the sub-image, cutting out a partial image from the cut out position, and adding the partial image on the main image, and
    misalignment of the composite image decreases as the composite image is in focus with the subject on the basis of the amount and a predetermined cutout rule.

5. The digital camera according to claim 4, wherein
    the predetermined cutout rule is based on a principle of triangulation based on an interval between the main lens and the sub-lens, and distance from the digital camera to the subject on the basis of the amount.

6. The digital camera according to claim 1, wherein
    the main image of the object is captured from a different angle from the sub-image of the subject.

* * * * *